United States Patent [19]

Fujita et al.

[11] Patent Number: 5,331,054
[45] Date of Patent: Jul. 19, 1994

[54] PROPYLENE COPOLYMER COMPOSITION

[75] Inventors: Takashi Fujita; Toshihiko Sugano; Hajime Mizuno; Hideshi Uchino, all of Yokkaichi, Japan

[73] Assignee: Mitsubishi Petrochemical Company, Ltd., Tokyo, Japan

[21] Appl. No.: 962,837

[22] Filed: Oct. 19, 1992

[30] Foreign Application Priority Data

Oct. 21, 1991 [JP] Japan .................. 3-272447
Oct. 21, 1991 [JP] Japan .................. 3-272448

[51] Int. Cl.$^5$ .............. C08L 23/10; C08L 23/14; C08L 23/18
[52] U.S. Cl. ............................. 525/240; 428/516
[58] Field of Search ........................... 525/240

[56] References Cited

U.S. PATENT DOCUMENTS

| | | | |
|---|---|---|---|
| 3,472,829 | 10/1969 | Claybaugh et al. | 526/82 |
| 4,211,690 | 7/1980 | Asano et al. | 525/88 |
| 4,303,708 | 12/1981 | Gebhardt et al. | 428/516 |
| 4,390,385 | 6/1983 | Ferguson et al. | 525/240 |
| 4,500,682 | 2/1985 | Chiba et al. | 525/240 |
| 4,892,851 | 1/1990 | Ewen et al. | 502/104 |

FOREIGN PATENT DOCUMENTS

| | | |
|---|---|---|
| 0119508 | 9/1984 | European Pat. Off. . |
| 0419677 | 4/1991 | European Pat. Off. . |
| 0433986 | 6/1991 | European Pat. Off. . |
| 0495099 | 7/1992 | European Pat. Off. . |
| 1917651 | 10/1970 | Fed. Rep. of Germany . |
| 57-185336 | 11/1982 | Japan . |
| 3081356 | 4/1991 | Japan . |
| 90/07526 | 7/1990 | World Int. Prop. O. . |

Primary Examiner—Carman J. Seccuro, Jr.
Attorney, Agent, or Firm—Oblon, Spivak, McClelland, Maier & Neustadt

[57] ABSTRACT

A propylene copolymer composition enabling the production of a film having excellent low-temperature heat sealing ability and blocking resistance, is obtained by blending 1 to 70 wt % of a component A and 30 to 99 wt % of a component B. The component A comprises either a propylene homopolymer or a copolymer of propylene with not more than 10 mol % of ethylene or an a-olefin having a carbon number of 4 to 20, and has a molecular weight distribution (Mw/Mn) of not more than 3, a mean elution temperature of 40° to 100° C., and an elution dispersion degree ($\sigma$ value) of not more than 10. The component B comprises a copolymer of propylene with ethylene and/or an $\alpha$-olefin having a carbon number of 4 to 20, and has a molecular weight distribution (Mw/Mn) of 3.5 to 10.

6 Claims, No Drawings

PROPYLENE COPOLYMER COMPOSITION

BACKGROUND OF THE INVENTION

The present invention relates to a propylene random copolymer composition. Particularly, the present invention relates to a propylene polymer composition suitable for forming a heat sealing film usable as a film for packaging cigarettes, caramels, etc., the composition being obtained by blending at a suitable ratio a propylene polymer and a propylene random copolymer that have specific properties.

As is well known, a propylene homopolymer or copolymer (these will hereinafter be generically referred to as "propylene polymers" unless otherwise specified) has excellent properties, which allow its use to be developed in a wide range of fields.

For instance, a propylene polymer is widely used to form a packaging or wrapping film. Since polypropylene has a relatively high melting point, when a polypropylene is to be applied to such use, in order to improve heat sealing ability at low temperatures, a propylene random copolymer is generally used, in which ethylene or an α-olefin having a carbon number of 4 to 20 is copolymerized with propylene.

Although a packaging or wrapping film comprising a conventional propylene random copolymer has superior transparency and scratch resistance to a film comprising a low-density polyethylene, its heat sealing ability at low temperatures is still insufficient. In order to further improve low-temperature heat sealing ability a copolymer is known in which an α-olefin having a carbon number of 4 to 20 is copolymerized in an increased amounts. Although such an increase enables the resultant film to have an improved low-temperature heat sealing ability, its blocking resistance deteriorates and its rigidity is lowered.

Thus, in order to improve low-temperature heat sealing ability and blocking resistance, the advent of a propylene random copolymer having a low melting point and containing only a small mount of component that causes blocking, is desired.

Hitherto, a propylene has been produced by employing, in general, an olefin polymerization catalyst comprising a titanium compound and an organic aluminum compound. In recent years, however, proposals such as the following have been made: proposals concerning a novel Ziegler-type olefin catalyst comprising a metallocene compound and alumoxane (Japanese Patent Laid-Open Nos. 58-19309, 60-35007, 61-130314, 63-295607, 1-275609, 1-301704, and 2-41303); proposals concerning a propylene random copolymer and a method of producing the same using such an olefin polymerization catalyst (Japanese Patent Laid-Open Nos. 62-119215, 1-266116, 2-173014, 2-173015, and 2-247207); and proposals concerning use of such a copolymer as a heat sealing agent (Japanese Patent Laid-Open No. 2-173016).

It is possible with these proposals to obtain a propylene random copolymer having a low melting point and containing only a small amount of component that causes blocking. However, the proposals have some problems. For example, the molecular weight distribution is such that it is too narrow to form a film in practice, or causes surface roughness which renders the film unusable.

SUMMARY OF THE INVENTION

Accordingly, an object of the present invention is to provide a propylene copolymer composition which can be formed into a film having excellent low-temperature heat sealing ability and blocking resistance.

In order to achieve the above object, according to one aspect of the present invention, there is provided a polypropylene composition containing 1 to 70% by weight of the following propylene polymer (A), and 99 to 30% by weight of the following propylene random copolymer (B):

propylene polymer (A):
the propylene polymer having the following properties (a) to (c):

(a) the propylene polymer is either a propylene homopolymer or a propylene polymer containing not more than 10 mol % of ethylene or an α-olefin having a carbon number of 4 to 20;

(b) the propylene polymer has a molecular weight distribution (Mw/Mn) of not more than 3; and (c) the propylene polymer has a mean elution temperature ($T_{50}$) ranging from 40° to 100° C., and an elution dispersion degree ($\sigma$ value) of not more than 10, propylene random copolymer (B):
the propylene random copolymer comprising propylene, and ethylene and/or an α-olefin having a carbon number of 4 to 20, the propylene random copolymer having the following properties (d) and (e): (d) the propylene random copolymer has 90 to 99.5 mol % of structural units obtained from propylene, and 0.5 to 10 mol % of structural units obtained from ethylene and-/or an α-olefin having a carbon number of 4 to 20; and (e) the propylene random copolymer has a molecular weight distribution (Mw/Mn) of 3.5 to 10.

According to another aspect of the present invention, there is provided another polypropylene composition containing 1 to 70% by weight of the following propylene polymer (A), and 99 to 30% by weight of the following propylene random copolymer (B):

propylene polymer (A):
the propylene polymer having the following properties (a) to (c):

(a) the propylene polymer is either a propylene homopolymer or a propylene polymer containing less than 0.5 mol. % of ethylene or an α-olefin having a carbon number of 4 to 20;

(b) the propylene polymer has a molecular weight distribution (Mw/Mn) of not more than 3; and (c) the propylene polymer has a mean elution temperature ($T_{50}$) ranging from 40° to 100° C., and an elution dispersion degree ($\sigma$ value) of not more than 10, propylene random copolymer (B):
the propylene random copolymer comprising propylene, and ethylene and/or an α-olefin having a carbon number of 4 to 20, the propylene random copolymer having the following properties (d) and (e):

(d) the propylene random copolymer has 90 to 99.5 mol % of structural units obtained from propylene, and 0.5 to 10 mol % of structural units obtained from ethylene and/or an α-olefin having a carbon number of 4 to 20; and (e) the propylene random copolymer has a molecular weight distribution (Mw/Mn) of 3.5 to 10.

According to still another aspect of the present invention, there is provided a copolymer composition containing 1 to 70% by weight of the following propylene random copolymer (A), and 99 to 30% by weight of the following propylene random copolymer (B):

propylene random copolymer (A):

the propylene random copolymer (A) comprising propylene, and ethylene and/or an α-olefin having a carbon number of 4 to 20, the propylene random copolymer (A) having the following properties (a) to (c):

(a) the propylene random copolymer (A) has 90 to 99.5 mol % of structural units obtained from propylene, and 0.5 to 10 mol % of structural units obtained from ethylene and/or an α-olefin having a carbon number of 4 to 20;

(b) the propylene random copolymer (A) has a molecular weight distribution (Mw/Mn) of not more than 3; and · (c) the propylene random copolymer (A) has a mean elution temperature ($T_{50}$) ranging from 40° to 90° C., and an elution dispersion degree ($\sigma$ value) of not more than 10, propylene random copolymer (B):

the propylene random copolymer (B) comprising propylene, and ethylene and/or an α-olefin having a carbon number of 4 to 20, the propylene random copolymer (B) having the following properties (d) and (e):

(d) the propylene random copolymer (B) has 90 to 99.5 mol % of structural units obtained from propylene, and 0.5 to 10 mol % of structural units obtained from ethylene and/or an α-olefin having a carbon number of 4 to 20; and (e) the propylene random copolymer (B) has a molecular weight distribution (Mw/Mn) of 3.5 to 10.

The above molecular weight distribution (Mw/Mn) is a value obtained by gel permeation chromatography (hereinafter abbreviated to "GPC"), and the mean elution temperature ($T_{50}$) is a value based on a polymer elution curve obtained by a temperature rising elution fraction (hereinafter abbreviated to "TREF") method employing o-dichlorobenzene as a solvent. Details of these values will be described later.

DETAILED DESCRIPTION OF THE INVENTION

I. Propylene Polymer (A)

The propylene polymer (A) contained in a composition according to the present invention is a propylene polymer containing not more than 0.5 mol % of ethylene and/or an α-olefin having a carbon number of 4 to 20, or a propylene random copolymer having 90 to 99.5 mol % of structural units obtained from propylene, and 0.5 to 10 mol % of structural units obtained from ethylene and/or an α-olefin having a carbon number of 4 to 20.

Thus, the propylene polymer (A) according to the present invention comprises either a propylene homopolymer or a propylene polymer containing not more than 10 mol % of ethylene and/or an α-olefin having a carbon number of 4 to 20.

Examples of α-olefins having a carbon number of 4 to 20, preferably 4 to 10 include 1-butene, 1-pentene, 3-methylbutene-1, 1-hexene, 4-methylpentene-1, 1-heptene, 1-octene, 1-nonene, 1-decene, and 1-hexadecene. Among these, the preferable a-olefins are 1-butene, 1-hexene, 1-octene, and 4-methyl-pentene-1.

Preferable structural-unit ratios vary in accordance with the types of monomer(s) other than propylene. However, structural units obtained from propylene generally amount up to 92 to 99 mol %.

The propylene polymer (A) has a molecular weight distribution (Mw/Mn) of not more than 3, preferably, within a range from 1 to 2.8. In general, the use of a catalyst comprising a metallocene compound and alumoxane provides only those polymers having Mw/Mn values of not more than 3. If the molecular weight distribution exceeds 3, the catalyst itself is non-uniform, and this is not preferable because blocking resistance may be deteriorated.

The propylene polymer(A) has a number average molecular weight (Mn) of 3,000 or more, normally 3,000 to 500,000, preferably 10,000 to 300,000 and more preferably 20,000 to 200,000.

The molecular weight of the copolymer was evaluated by GPC in accordance with "Gel Permeation Chromatography" (by Takeuchi, published by Maruzen K.K.). Specifically, a standard polystyrene (a monodisperse polystyrene, produced by Tosoh K.K.) having a known molecular weight was used, and, through the universal method, a number average molecular weight (Mn) and a weight average molecular weight (Mw) were obtained to evaluate (Mw/Mn). In the above evaluation, the 150C-ALC/GPC (trade name; produced by Waters) was used together with three columns ("AD80 M/S (trade name)" produced by Showa Denko K.K.). 200 ml of the sample was diluted with o-dichlorobenzene at a concentration of 0.2% by weight (percentages by weight will hereinafter be abbreviated to "wt %"), and measurement was conducted at 140° C. at a flow rate of 1 ml/min.

The propylene polymer (A) has a mean elution temperature ($T_{50}$) on the basis of the TREF method of 40° to 100° C., and an elution dispersion degree ($\sigma$ value) of not more than 10. The above mean elution temperature ($T_{50}$) indicates a temperature at which the accumulated weight of the eluted portion of the polymer equals up to 50% of the total weight of the polymer. The above elution dispersion degree ($\sigma$ value) is based on the assumption that the amount of elution in the TREF method changes in accordance with the normal probability distribution as the elution temperature changes, and the weight accumulated amount of elution I(t) is expressed by the following mathematical expression:

$$I(t) = \int_{\infty}^{T} (1/\sigma \sqrt{2} \; \exp(-1/2 \; (T - T_0/\sigma)^2 \; dT$$

Specifically, the $\sigma$ value is defined as: $\sigma = T_{84.1} - T_{50}$, where $T_{84.1}$ indicates a temperature at which the accumulated weight equals 84.1 wt %.

The above TREF evaluation was conducted by using the apparatus and method described in "Journal of Applied Polymer Science", Vol 26, pages 4217 to 4231, (1981).

The propylene polymer (A) preferably has a mean elution temperature of 50° to 95° C. and an elution dispersion degree ($\sigma$ value) of 0.1 or more and not more than 9, and the polymer (A) more preferably has a mean elution temperature of 50° to 90° C. and an elution dispersion degree ($\sigma$ value) of 0.1 or more and not more than 8. If the mean elution temperature is less than 40° C., the molecular weight is too small or the melting point is too low to avoid blocking. If this temperature exceeds 100° C., the molecular weight is too great to enable formation or the melting point is too high to ensure heat sealing ability at low temperatures. If the elution dispersion degree exceeds 10, there is too much blocking-causing component to ensure both heat sealing ability at low temperatures and blocking resistance.

1. Production of Propylene Polymer (A)

The propylene polymer (A) of the above-specified kind can be produced by using a so-called Kaminsky-type catalyst, specifically, a polymerization catalyst comprising the following catalyst components (C) and (D):

1) Catalyst
i) Catalyst Component (C)

The catalyst component (C) is a transition metal compound expressed by either the following general formula (1):

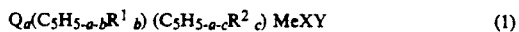  (1)

or the following general formula (2):

  (2)

In the above formulae, the symbol Q represents a bonding group bridging together two conjugate five-member cyclic ligands $(C_5H_{5-a-b}R^1{}_b)$ and $(C_5H_{5-a-c}R^2{}_c)$, and the symbol S represents a bonding group bridging together a conjugate five-member cyclic ligand $(C_5H_{5-a-d}R^3{}_d)$ and a group represented by the symbol Z. The symbol a attached to the symbols Q and S represents either 0 or 1. Among them, components represented by the formula (1) wherein a is 1, are preferable.

Specific examples of these bonding groups Q and S include:

(a) an alkylene group, such as methylene group, ethylene group, isopropylene group, phenyl methylethylene group, diphenyl methylene group or cyclohexylene group;

(b) a silylene group, such as silylene group, dimethyl silylene group, phenylmethyl silylene group, diphenyl silylene group, disilylene group or tetramethyl disilylene group;

(c) a hydrocarbon group containing germanium, phosphorus, nitrogen, boron or aluminum, specifically $(CH_3)_2Ge$ group, $(C_6H_5)_2Ge$ group, $(CH_3)P$ group, $(C_6H_5)P$ group, $(C_4H_9)N$ group, $(C_6H_5)N$ group, $(CH_3)B$ group, $(C_4H_9)B$ group, $(C_6H_5)B$ group, $(C_6H_5)Al$ group or $(CH_3O)Al$ group.

Among these, an alkylene group and a silylene group are preferable.

In the above formulae, although the conjugate five-member cyclic ligands are individually defined as $(C_5H_{5-a-b}R^1{}_b)$, $(C_5H_{5-a-c}R^2{}_c)$ and $(C_5H_{5-a-d}R^3{}_d)$, the respective definitions of b, c and d themselves are the same while those of $R^1$, $R^2$ and $R^3$ are also the same, as will be described below in detail. Therefore, these three conjugate five-member cyclic groups may naturally be either the same or different.

A specific example of the conjugate five-member cyclic groups is a cyclopentadienyl group in which there is no substituent group other than the bridging group Q or S under the condition of b (c or d)=0. Where the cyclopentadienyl group, an example of a conjugate five-member cyclic group, has a substituent group under the condition of b (c or d)=0, a specific example of $R^1$ ($R^2$ or $R^3$) is a hydrocarbon radical ($C_1$ to $C_{20}$, preferably $C_1$ to $C_{12}$). The hydrocarbon radical may be either a univalent or a bivalent radical that is bonded with the cyclopentadienyl group. A typical example of the second case is the case where the $R^1$ ($R^2$ or $R^3$) is covalently bonded to a double bond of the cyclopentadienyl group to form a six-member condensed ring, that is, the case where the conjugate five-member cyclic group is an indenyl group or a fluorenyl group. Thus, typical examples of the conjugate five-member cyclic groups are cyclopentadiene, indenyl and fluorenyl groups (substituted or non-substituted).

Examples of $R^1$, $R^2$ and $R^3$ include the following groups besides the above-mentioned hydrocarbon radical having $C_1$ to $C_{20}$, preferably $C_1$ to $C_{12}$; a halogen group such as fluorine, chlorine or bromine; an alkoxy group having an alkyl group of such as $C_1$ to $C_{12}$; a silicon-containing hydrocarbon group such as a group of a carbon number of 1 to 24 or thereabout which contains a silicon atom in the form of $-Si(R^1)(R^2)(R^3)$; a phosphorus-containing hydrocarbon group such as a group of a carbon number of 1 to 18 or thereabout which contains a phosphorus atom in the form of $-P(R)(R')$; a nitrogen-containing hydrocarbon group such as a group of a carbon number of 1 to 18 or thereabout which contains a nitrogen atom in the form of $-N(R)(R')$; and a boron-containing hydrocarbon group such as a group of a carbon number of 1 to 18 or thereabout which contains a boron atom in the form of $-B(R)(R')$. Where there are a plurality of $R^1$ ($R^2$ or $R^3$) groups under the condition of b (c or d) is 2 or greater, these groups may be either the same or different.

The symbols b, c and d represent integers which satisfy the relationships of $0 \leq b \leq 5$, $0 \leq c \leq 5$ and $0 \leq d \leq 5$ when a=0, and satisfy the relationships of $0 \leq b \leq 4$, $0 \leq c \leq 4$ and $0 \leq d \leq 4$ when a=1.

In the above formulae, the symbol Me represents a transition metal in the IVB to VIB groups of the periodic table, preferably, titanium, zirconium or hafnium. Zirconium is preferable.

The symbol Z represents one of the following: oxygen (—O—); sulfur (—S—); an alkoxyl group having a carbon number of 1 to 20, preferably 1 to 10; a thioalkoxy group having a carbon number of 1 to 20, preferably 1 to 12; a silicon-containing hydrocarbon group having a carbon number of 1 to 40, preferably 1 to 18; a nitrogen-containing hydrocarbon group having a carbon number of 1 to 40, preferably 1 to 18; and a phosphorus-containing hydrocarbon group having a carbon number of 1 to 40, preferably 1 to 18.

The symbols X and Y each represent any of the following: hydrogen; a halogen group; a hydrocarbon radical having a carbon number of 1 to 20, preferably 1 to 10; an alkoxy group having a carbon number of 1 to 20, preferably 1 to 10; an amino group; a phosphorus-containing hydrocarbon group having a carbon number of 1 to 20, preferably 1 to 12 (a specific example of which is a diphenylphosphine group); and a silicon-containing hydrocarbon group having a carbon number of 1 to 20, preferably 1 to 12 (a specific example of which is a trimethylsilyl group). The atoms or groups represented by the symbols X and Y may be either the same or different. Among the above-listed categories, a halogen group and a hydrocarbon radical are preferable.

When the transition metal Me is zirconium, specific examples of transition metal compounds expressed by the above general formulae include the following:

(a) a transition metal compound having no bonding group that cross-links, and having two conjugate five-member cyclic ligands, such as:

(1) bis(cyclopentadienyl) zirconium dichloride;

(2) bis(methylcyclopentadienyl) zirconium dichloride;

(3) bis(dimethylcyclopentadienyl) zirconium dichloride;

(4) bis(trimethylcyclopentadienyl) zirconium dichloride;

(5) bis(tetramethylcyclopentadienyl) zirconium dichloride;

(6) bis(pentamethylcyclopentadienyl) zirconium dichloride;

(7) bis(n-buthylcyclopentadienyl) zirconium dichloride;

(8) bis(indenyl) zirconium dichloride;

(9) bis(fluorenyl) zirconium dichloride;

(10) bis(cyclopentadienyl) zirconium monochloride monohydride;

(11) bis(cyclopentadienyl) methylzirconium monochloride;

(12) bis(cyclopentadienyl) ethylzirconium monochloride;

(13) bis(cyclopentadienyl) phenylzirconium monochloride;

(14) bis(cyclopentadienyl) zirconium dimethyl

(15) bis(cyclopentadienyl) zirconium diphenyl;

(16) bis(cyclopentadienyl) zirconium dineopentyl;

(17) bis(cyclopentadienyl) zirconium dihydride;

(18) (cyclopentadienyl) (indenyl) zirconium dichloride; or

(19) (cyclopentadienyl) (fluorenyl) zirconium dichloride;

(b) a transition metal compound having two conjugate five-member cyclic ligands bridged together by an alkylene group, such as:

(1) methylene bis(indenyl) zirconium dichloride;

(2) ethylene bis(indenyl) zirconium dichloride;

(3) ethylene bis(indenyl) zirconium monohydride monochloride;

(4) ethylene bis(indenyl) methylzirconium monochloride;

(5) ethylene bis(indenyl) zirconium monomethoxy monochloride;

(6) ethylene bis(2,4-dimethylindenyl) zirconium dihloride;

(7) ethylene bis(indenyl) zirconium diethoxide;

(8) ethylene bis(indenyl) zirconium dimethyl;

(9) ethylene bis(4, 5, 6, 7-tetrahydroindenyl) zirconium dichloride;

(10) ethylene bis(2-methylindenyl) zirconium dichloride;

(11) ethylene bis(2-ethylindenyl) zirconium dichloride;

(12) ethylene (2, 4-dimethylcyclopentadienyl) (3', 5'-dimethylcyclopentadienyl) zirconium dichloride;

(13) ethylene (2-methyl-4-tert-butylcyclopentadienyl) (3'-tert-butyl-5'-methylcyclopentadienyl) zirconium dichloride;

(14) ethylene (2, 3, 5-trimethylcyclopentadienyl) (2', 4', 5'-trimethylcyclopentadienyl) zirconium dichloride;

(15) isopropylidene bis(indenyl) zirconium dichloride; (16) isopropylidene bis(2, 4-dimethylcyclopentadienyl) (3', 5'-dimethylcyclopentadienyl) zirconium dichloride;

(17) isopropylidene bis(2-methyl-4-tert-butylcyclopentadienyl) (3'-tert-butyl-5-methylcyclopentadienyl) zirconium dichloride;

(18) methylene (cyclopentadienyl) (3, 4-dimethylcyclopentadienyl) zirconium dichloride; (19) methylene (cyclopentadienyl) (3, 4-dimethylcyclopentadienyl) zirconium chloride hydride;

(20) methylene (cyclopentadienyl) (3, 4-dimethylcyclopentadienyl) zirconium dimethyl;

(21) methylene (cyclopentadienyl) (3, 4-dimethylcyclopentadienyl) zirconium diphenyl;

(22) methylene (cyclopentadienyl) (3, 4-trimethylcyclopentadienyl) zirconium dichloride;

(23) methylene (cyclopentadienyl) (tetramethylcyclopentadienyl) zirconium dichloride;

(24) isopropylidene (cyclopentadienyl) (3, 4-dimethylcyclopentadienyl) zirconium dichloride;

(25) isopropylidene (cyclopentadienyl) (2, 3, 4, 5-tetramethylcyclopentadienyl) zirconium dichloride;

(26) isopropylidene (cyclopentadienyl) (3-methylindenyl) zirconium dichloride;

(27) isopropylidene (cyclopentadienyl) (fluorenyl) zirconium dichloride;

(28) isopropylidene (2-methylcyclopentadienyl) (fluorenyl) zirconium dichloride;

(29) isopropylidene (2, 5-dimethylcyclopentadienyl) (3, 4-dimethylcyclopentadienyl) zirconium dichloride;

(30) isopropylidene (2, 5-dimethylcyclopentadienyl) (fluorenyl) zirconium dichloride;

(31) ethylene (cyclopentadienyl) (3, 5-dimethylcyclopentadienyl) zirconium dichloride;

(32) ethylene (cyclopentadienyl) (fluorenyl) zirconium dichloride;

(33) ethylene (2, 5-dimethylcyclopentadienyl) (fluorenyl) zirconium dichloride;

(34) ethylene (2, 5-diethylcyclopentadienyl) (fluorenyl) zirconium dichloride;

(35) diphenylmethylene (cyclopentadienyl) (3, 4-diethylcyclopentadienyl) zirconium dichloride;

(36) diphenylmethylene (cyclopentadienyl) (3, 4-diethylcyclopentadienyl) zirconium dichloride;

(37) cyclohexylidene (cyclopentadienyl) (fluorenyl) zirconium dichloride; or

(38) cyclohexylidene (2,5-dimethylcyclopentadienyl) 3', 4'-dimethyldimethylcyclopentadienyl) zirconium dichloride;

(c) a transition metal compound having five-member cyclic ligands bridged together by a silylene group, such as:

(1) dimethylsilylene bis(indenyl) zirconium dichloride;

(2) dimethylsilylene bis(4, 5, 6, 7-tetrahydroindenyl) zirconium dichloride;

(3) dimethylsilylene bis(2-methylindenyl) zirconium dichloride;

(4) dimethylsilylene bis(2-ethylindenyl) zirconium dichloride;

(5) dimethylsilylene bis(2,4-dimethylindenyl) zirconium dichloride;

(6) dimethylsilylene (2, 4-dimethylcyclopentadienyl) 3', 5'-dimethylcyclopentadienyl) zirconium dichloride;

(7) phenylmethylsilylene bis(indenyl) zirconium chloride (8) phenylmethylsilylene bis(4, 5, 6, 7-tetrahydroindenyl ) zirconium dichloride;

(9) phenylmethylsilylene (2, 4-dimethylcyclopentadienyl) (3', 5'-dimethylcyclopentadienyl) zirconium dichloride;

(10) phenylmethylsilylene (2, 3, 5-trimethylcyclopentadienyl) (2, 4, 5-trimethylcyclopentadienyl) zirconium dichloride;

(11) phenylmethylsilylene bis- (tetramethylcyclopentadienyl) zirconium dichloride;

(12) diphenylsilylene bis(indenyl) zirconium dichloride;

(13) tetramethyldisilylene bis(indenyl) zirconium dichloride;

(14) tetramethyldisilylene bis(cyclopentadienyl) zirconium dichloride;

(15) tetramethyldisilylene (3-methylcyclopentadienyl) (indenyl) zirconium dichloride;

(16) dimethylsilylene (cyclopentadienyl) (3, 4-dimethylcyclopentadienyl) zirconium dichloride;

(17) dimethylsilylene (cyclopentadienyl) (trimethylcyclopentadienyl) zirconium dichloride;

(18) dimethylsilylene (cyclopentadienyl) (tetramethylcyclopentadienyl) zirconium dichloride;

(19) dimethylsilylene (cyclopentadienyl) (3, 4-diethylcyclopentadienyl) zirconium dichloride;

(20) dimethylsilylene (cyclopentadienyl) (triethylcyclopentadienyl) zirconium dichloride;

(21) dimethylsilylene (cyclopentadienyl) (tetraethylcyclopentadienyl) zirconium dichloride;

(22) dimethylsilylene (cyclopentadienyl) (fluorenyl) zirconium dichloride;

(23) dimethylsilylene (cyclopentadienyl) (2, 7-di-t-butylfluorenyl) zirconium dichloride;

(24) dimethylsilylene (cyclopentadienyl) (octahydrofluorenyl) zirconium dichloride;

(25) dimethylsilylene ( 2-methylcyclopentadienyl) (fluorenyl) zirconium dichloride;

(26) dimethylsilylene (2, 5-dimethylcyclopentadienyl) (fluorenyl) zirconium dichloride;

(27) dimethylsilylene (2-ethylcyclopentadienyl) (fluorenyl) zirconium dichloride;

(28) dimethylsilylene (2, 5-diethylcyclopentadienyl) (fluorenyl) zirconium dichloride;

(29) diethylsilylene (2-methylcyclopentadienyl) (2, 7-di-t-butylfluorenyl) zirconium dichloride;

(30) dimethylsilylene (2, 5-dimethylcyclopentadienyl) (2, 7-di-t-butylfluorenyl) zirconium dichloride;

(31) dimethylsilylene (2-ethylcyclopentadienyl) (2, 7-di-t-butylfluorenyl) zirconium dichloride;

(32) dimethylsilylene (diethylcyclopentadienyl) (2, 7-di-t-butylfluorenyl) zirconium dichloride;

(33) dimethylsilylene (methylcyclopentadienyl) (octahydrofluorenyl) zirconium dichloride;

(34) dimethylsilylene (dimethylcyclopentadienyl) (octahydrofluorenyl) zirconium dichloride;

(35) dimethylsilylene (ethylcyclopentadienyl) (octahydrofluorenyl) zirconium dichloride; or

(36) dimethylsilylene (diethylcyclopentadienyl) (octahydrofluorenyl) zirconium dichloride;

(d) a transition metal compound having five-member cyclic ligands bridged together by a hydrocarbon group containing germanium, aluminium, boron, phosphorus or nitrogen, such as:

(1) dimethylgermanium bis(indenyl) zirconium dichloride;

(2) dimethylgermanium (cyclopentadienyl) (fluorenyl) zirconium dichloride;

(3) methylaluminium bis(indenyl) zirconium dichloride;

(4) phenylaluminium bis(indenyl) zirconium dichloride;

(5) phenylphosphino bis(indenyl) zirconium dichloride;

(6) ethylphorano bis(indenyl) zirconium dichloride;

(7) phenylamino bis(indenyl) zirconium dichloride; or (8) phenylamino (cyclopentadienyl) (fluorenyl) zirconium dichloride;

(e) a transition metal compound having a single five-member cyclic ligand, such as:

(1) (pentamethylcyclopentadienyl) bis(phenyl)amino zirconium dichloride;

(2) (indenyl) bis(phenyl)amino zirconium dichloride;

(3) (pentamethylcyclopentadienyl) bis(trimethylsilyl)amino zirconium dichloride;

(4) pentamethylcyclopentadienyl phenoxy zirconium dichloride;

(5) dimethylsilylene (tetramethylcyclopentadienyl) phenylamino zirconium dichloride;

(6) dimethylsilylene (tetrahydroindenyl) decylamino zirconium dichloride;

(7) dimethylsilylene (tetrahydroindenyl) (trimethylsilyl)-amino zirconium dichloride;

(8) dimethyl germanium (tetramethylcyclopentadienyl) tert-butylamino zirconium dichloride; or (9) dimethyl germanium (tetramethylcyclopentadienyl) phenylamino zirconiumdichloride; and (f) a transition metal compound obtained by substituting the chlorine of the compounds listed above under Items (a) to (e) by bromine, iodine, hydride, methyl, phenyl, or the like.

Further, it is possible to use a compound obtained by substituting the central metal (zirconium) of any of the zirconium compounds listed above under Items (a) to (e) by titanium, hafnium, niobium, molybdenum or tungsten.

Among these, preferable compounds are zirconium compounds, hafnium compounds, and titanium compounds. More preferable compounds are zirconium and hafnium compounds in which an alkylene or silylene group cross-links.

When the propylene polymer (A) to be produced is a propylene random copolymer having 90 to 99.5 mol % of structural units obtained from propylene, and 0.5 to 10 mol % of structural units obtained from ethylene and/or an α-olefin having a carbon number of 4 to 20, it is preferable to use, as the catalyst component (C), a transition metal compound expressed by the following general formula:

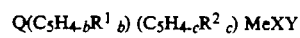

$$Q(C_5H_{4-b}R^1{}_b)(C_5H_{4-c}R^2{}_c)MeXY$$

which corresponds to the above-mentioned formula (1) when a is 1 and wherein b and c are the same definition set forth in formula (1).

ii) Catalyst Component (D)

The other catalyst component (D) is alumoxane, which is a product obtained by the reaction of water with either one or a plurality of kinds of trialkyl aluminum. Specific examples of alumoxane include: methylalumoxane, ethylalumoxane, butylalumoxane, isobutylalumoxane, etc. obtained from water and one kind of trialkyl aluminum; and methylethylalumoxane, methylbutylalumoxane, methylisobutylalumoxane, etc. obtained from water and a plurality of kinds of trialkyl aluminum.

It is also possible to use a plurality of such alumoxanes, or to use an alumoxane in the above list together with an other alkyl aluminum such as trimethyl aluminum, triethyl aluminum, triisobutyl aluminum, dimethyl aluminum chloride, or the like.

Further, it is possible to use a denatured alumoxane obtained by reacting either one or two kinds of alumoxane with another organic aluminum compound.

Among the above, preferable examples of alumoxane are methylalumoxane, isobutylalmoxane, methylisobutylalumoxane, and mixtures of these alumoxanes with trialkyl aluminum. Particularly preferable examples are methylalumoxane and methyl isobutylalumoxane.

Such alumoxanes can be prepared by various known method. Specific examples of alumoxane preparation methods include:

(a) A method comprising directly reacting trialkyl aluminum water by using a suitable organic solvent such as toluene, benzene, or ether (b) A method comprising reacting trialkyl aluminum with a salt hydrate having water of crystallization, such as a hydrate of copper sulfate or aluminum sulfate;

(c) A method comprising reacting trialkyl aluminum with water with which silica gel or the like is impregnated;

(d) A method comprising mixing trimethyl aluminum and triisobutyl aluminum together, and causing the mixture to directly react with water by using a suitable organic solvent such as toluene, benzene, or ether;

(e) A method comprising mixing trimethyl aluminum and triisobutyl aluminum together, and subjecting the mixture to a heating reaction with a salt hydrate having water of crystallization, such as a hydrate of copper sulfate or aluminum sulfate;

(f) A method comprising impregnating silica gel or the like with water, treating the impregnated substance with triisobutyl aluminum, and then treating the resultant substance with trimethyl aluminum; and (g) A method comprising synthesizing each of methylalumoxane and isobutylalumoxane by a known method, mixing together predetermined amounts of these two components, and subjecting the mixture to a heating reaction.

2) Preparation of Catalyst

The polymerization catalyst used in the present invention is prepared by bringing catalyst components (C) and (D) such as those described above, into contact with each other either inside or outside of an autoclave while monomers to be polymerized are either present or absent.

The catalyst components (C) and (D) may be used in any desired amounts. However, these components (C) and (D) are generally used in such e manner that the atomic ratio (Al/Me) between the aluminum atoms in the component (D) and the transition metal atoms in the component (C) is 0.01 to 100,000, preferably 0.1 to 30,000 and more preferably 10 to 20,000. Any desired method may be used to bring these components (C) and (D) into contact with each other. The components (C) and (D) may be individually introduced at the time of polymerization; alternatively, the components (C) and (D) may be used in polymerization after they have been brought into mutual contact.

The polymerization catalyst used in the present invention may contain one or more component other than the components (C) and (D). Examples of such third (optional) components include active hydrogen-containing compounds such as water, methanol, ethanol, butanol and the like; electron-imparting compounds such as ethers, esters and amines; alkoxy-containing compounds such as phenyl borate, dimethylmethoxy aluminum, phenyl phosphite, tetraethoxy silane, diphenyldimehtoxy silane and the like; and organic boron compounds such as triphenyl boron, tributyl boron and the like.

3) Method of Producing Propylene Polymer (A)

The propylene polymer (A) according to the present invention is produced, while a polymerization catalyst comprising catalyst components (C) and (D) described above, is used, by mixing and bringing into contact with each other monomers either comprising propylene only or comprising propylene and ethylene or an α-olefin having a carbon number of 4 to 20.

If a copolymer is to be produced as the propylene polymer (A), the ratio between the respective amounts of the monomers in the reaction system need not be kept constant with respect to the passage of time. It is convenient to supply the monomers at a fixed mixing ratio. However, it is also possible to vary the mixing ratio of the monomers as time passes. Further, it is possible to dividingly add one of the monomers in view of the copolymerization reaction ratio.

Any polymerization method may be adopted so long as the catalyst components and the monomers can be efficiently brought into contact with each other. Specific examples of polymerization methods which may be adopted include slurry methods employing an inert solvent, slurry methods employing substantially no inert solvent and employing propylene and α-olefin as solvents; solution polymerizing methods; and gas phase methods in which substantially no liquid solvent is used and the monomers are substantially kept in their gas phase. These methods may be combined with continuous polymerization, batch polymerization or polymerization including a preliminary polymerization process.

In the case of slurry polymerization, a polymerization solvent comprising a saturated aliphatic or aromatic hydrocarbon such as hexane, heptane, pentane, cyclohexane, benzene or toluene, or a mixture thereof, is used. Polymerization is performed at a temperature of more than approximately −78° C., preferably a temperature of 0° to 150° C., and at this time, hydrogen may be used as a molecular-weight adjusting agent. In slurry polymerization, the component (C) is preferably used in an amount ranging from 0.001 to 1.0 g/l of a solvent.

A suitable polymerization pressure ranges from 0 to 90 kg/cm$^2$G, preferably from 0 to 60 kg/cm$^2$G, more preferably from 1 to 50 kg/cm$^2$G.

It is preferable to use a catalyst obtained by homopolymerizing propylene before copolymerization with a view to, for example, improving activity, preventing generation of a solvent-soluble by-product polymer, or preventing reduction in the melting point. Normally, the amount of such a part obtained by homopolymerizing propylene is adequate if it is not more than 10 wt %, preferably not more than 5 wt %, of the copolymer to be produced, and it is preferable that this amount is such that the produced polymer shows no DSC peak attributable to such a propylene-homopolymer.

When polymerizing such a propylene-homopolymer catalyst, a temperature equal to or lower than the temperature of subsequent copolymerization is generally used. Accordingly, a temperature of −30° to 70° C., preferably 0° to 50° C., is generally used in the propylene homopolymerization. With respect to the homopolymerization pressure, a pressure of normal pressure to 20 kg/cm$^2$G may be used. However, the usable range of the pressure may not necessarily be limited to the above range if the ratio of the propylene-homopolymer part with respect to the copolymer to be obtained is within the above predetermined range.

The molecular weight of the polymer (A) can be controlled by suitably adding hydrogen to the polymerization system.

II. Propylene Random Copolymer (B)

The propylene random copolymer (B) contained in a composition according to the present invention has 90 to 99.5 mol % of structural units obtained from propylene, and 0.5 to 10 mol % of structural units obtained from ethylene and/or an α-olefin having a carbon number of 4 to 20.

Examples of α-olefins having a carbon number of 4 to 20 include 1-butene, 1-pentene, 3-methylbutene-1, 1-hexene, 4-methylpentene-1, 1-heptene, 1-octene, 1-nonene, 1-decene and 1-hexadecene. Among these, preferable α-olefins are 1-butene, 1-hexene, 1-octene and 4-methyl-pentene-1.

Preferable ratios between the above structural units vary in accordance with the types of monomer(s) other than propylene. However, structural units obtained from propylene generally amount to up to 92 to 99 mol %.

The copolymer (B) has a molecular weight distribution (Mw/Mn; evaluated by GPC) within a range from 3.5 to 10, preferably, within a range from 4 to 9. If Mw/Mn > 10, the copolymer (B) cannot easily be mixed uniformly with the propylene polymer (which may be a copolymer) (A), and furthermore, the transparency of the final product will be deteriorated and the surface thereof will be rough. On the other hand, if Mw/Mn < 3.5, the film forming ability of the entire polymer will be deteriorated, thus failing to achieve improvement of the film forming ability of the composition according to the present invention. The copolymer (B) has a number average molecular weight (Mn) of preferably 10,000 to 200,000, more preferably 20,000 to 100,000.

Production of Propylene Random Copolymer (B)

The copolymer (B) according to the present invention may be polymerized by using a generally known Ziegler-type catalyst comprising a titanium compound and an organic aluminum compound. Preferably, Ziegler-type catalysts comprising: (a) titanium trichloride or a solid component containing titanium, magnesium and a halogen as an essential ingredient with electron donor compounds as an optional ingredient; (b) an organic aluminum compound, and optionally (c) electron donor compounds in particular can be used.

Examples of such catalysts include a catalyst comprising a $TiCl_3$ compound produced by Marubeni-Solvay and diethyl aluminum chloride and a catalyst comprising a highly-active catalyst component containing titanium, magnesium and a halogen as the essential element, triethyl aluminum, and an electron-donating compound (used when necessary). However, the present invention is not limited by these examples.

II. Production of Propylene Polymer Composition

A composition according to the present invention is obtained by blending at a suitable ratio a propylene polymer (A) and a propylene random copolymer (B), as have been described above.

The blending ratio of the polymer (A) and the copolymer (B) is 1 to 70 wt % and 99 to 30 wt %, preferably 3 to 50 wt % and 97 to 50 wt %, more preferably 5 to 50 wt % and 95 to 50 wt %. If this blending ratio of the polymer (A) is less than 1 wt %, no improvement is obtained in low-temperature heat sealing ability and blocking resistance. If the blending ratio of the polymer (A) exceeds 70 wt %, forming ability is not improved, and film formation is substantially impossible.

A composition according to the present invention may contain additional components other than the above essential components within a range within which such addition does not substantially hinder the achievement of improvement according to the present invention. Examples of additional components include various agents of the type normally used for a polyolefin, such as various assistants (e.g. antioxidants), neutralizing agents, ultraviolet absorbers, anti-bubbling agents, dispersants, antistatic agents, lubricants, molecular-weight adjusting agents (peroxide), auxiliaries such as nucleating agents and the like, rubber components and coloring agents.

A composition according to the present invention is preferably produced by mixing together the components a predetermined period of time with a mixer or kneader of the generally used type such as a Henschel mixer, Super mixer, V-blender, tumbler mixer, ribbon blender, Banbury mixer, kneader-blender or extruder, and forming the resultant mixture into pellet-shapes with an ordinary extruder.

The resultant composition is formed into various formed bodies by extrusion forming, blow forming, film forming, injection forming, compression forming, or the like. The effect of the present invention is remarkable particularly when the composition is formed into an extrusion-formed body.

The present invention will now be described by the examples.

EXPERIMENTS

A plurality of types of propylene polymers (A), specially, propylene polymers (A)-1, (A)-2, (A)-3, (A)-5 and (A)-6 were produced in the following manner for use in the various examples described later.

1) Production of Propylene Polymers (A):

Preparation of Catalyst Component

In order to produce the propylene polymers (A), a catalyst components (C)-1, (C) -2, (C)-3, (D)- 1, and (D)-2 were prepared as follows:

i) Catalyst Component (C)-1

200 ml of tetrahydrofuran (THF) and 15.5 g of fluorene were introduced into a 500 ml-flask whose interior had been subjected to sufficient nitrogen-substitution. After these substances were cooled to a temperature of not more than −50° C., 67 ml of a dilute solution of 0.094 mol of methyl lithium in diethyl ether (1.4 M/L) was dropped in over a period of 30 minutes. Thereafter, the temperature of the above substances was gradually raised to room temperature, and the substances were allowed to react for 3 hours. Then, the substances were again cooled to a temperature of not more than −50° C., and, thereafter, 10 g of 6, 6-dimethylfulvene was dropped in over 30 minutes. After the completion of the dropping, the above substances had their temperature gradually raised to room temperature, and then they were allowed to react for two days. Thereafter, the reaction was stopped by adding 60 ml of $H_2O$, and the ether layer was separated. After the ether layer was dehydrated by using anhydrous $MgSO_4$, the ether was subjected to evaporation drying, thereby obtaining 17.6 g of crude crystals of 2-cyclopentadienyl 2-fluorenyl propane.

Subsequently, 10 g of the above crude crystals was diluted with 100 ml of THF. After the dilution was cooled to a temperature of not more than −50° C., 46.0 ml of a dilute solution of 0.0736 mol of n-butyl lithium in hexane (1.6 M/L) was dropped in over 10 minutes. After the above substances had their temperature raised to room temperature over a period of 1 hour, they were allowed to react for 2 hours at room temperature. Then, the product of the reaction was dried by evaporating the solvent under a flow of nitrogen gas. Then, 100 ml of dichloromethane was added to the dried product, and the above substances were cooled to a temperature of not more than −50° C. Subsequently, the substances were fed with a solution which had previously been prepared by mixing 8.16 g of zirconium tetrachloride with 50 ml of dichloromethane at a low temperature, the feeding was conducted in such a manner that the total amount of the solution was fed at one time. After the above substances were mixed together, the temperature of the mixture was gradually raised over 3 hours, and the mixture was allowed to react at room temperature for 1 day. After the completion of the reaction, the solid matter was removed by filtering, and the filtrate was condensed to cause recrystallization, thereby obtaining 4.68 g of red isopropylidene (cyclopentadienyl) (fluorenyl) zirconium dichloride to serve as the catalyst component (C)-1.

ii) Catalyst Component (C)-2

In this production, all the necessary reactions were conducted in an inert gas atmosphere. Further, all the necessary reaction solvents were used after they had been dried.

5.0 g (33 mmol) of 2-methylindene was dissolved in 80 ml of THF in a 500 ml-glass reactor. While the solution was being cooled, a solution of 1.6M of n-butyl lithium in 21 ml of hexane was gradually dropped into the reactor. After the above substances had been agitated together at room temperature for 1 hour, they were again cooled. Thereafter, 3.1 g of 1, 2-dibromoethane was gradually dropped in. Then, the above substances were agitated together at room temperature for 12 hours, and 50 ml of water was added. Thereafter, the organic phase was separated, and dried. The organic phase was then washed with heptane several times, and dried, thereby obtaining 2.9 g of bis-(2-methylindenyl) ethane.

2.1 g (7.3 mmol) of the thus obtained bis-(2-methylindenyl) ethane was dissolved in 70 ml of THF. While the solution was being cooled, a solution of 1.6M of n-butyl lithium in 5.2 ml of hexane was gradually dropped. After the substances were agitated together at normal temperature for 3 hours, they were gradually dropped into a solution of 1.6 g (7.0 mmol) of zirconium tetrachloride in 60 ml of THF. After these substances had been agitated together for 5 hours, hydrogen chloride gas was bubbled, which process was followed by drying. Subsequently, toluene was added, and a soluble part was separated. The separated part was crystallized at a low temperature, thereby obtaining 0.95 g of a yellow powder.

The thus obtained compound was ethylene bis-(2-methylindenyl) zirconium dichloride. $^1$H-NMR (nuclear magnetic resonance) was used to confirm that, in this compound, the two 2-methylindenyl groups were asymmetric with each other, that is, they were not in the relationship of an object and a mirror-image with respect to a plane containing the zirconium atom.

iii) Catalyst Component (D)-1

In a reactor, 50 g of copper sulfate pentahydrate was poured by 5 g thereof at intervals of 5 minutes into a solution of 48.2 g of trimethyl aluminum in 565 ml of toluene at a temperature of 0° C. while these substances were agitated together. After the completion of the pouring, the temperature of the substances was gradually raised to 25° C., held at 25° C. of 2 hours, and then raised to 35° C., which was followed by a process of reacting the substances for 2 days. Thereafter, the remaining copper sulfate solid was separated by filtering, thereby obtaining a solution of alumoxane in toluene. The concentration of methylalumoxane was 27.3 mg/ml (2.7 w/v %).

The propylene polymers (A)-1 to (A)-3 were produced using suitable combinations of the catalyst components (C)-1, (C)-2 and (D)-1.

iv) Catalyst Component (C)-3

Dimethylsilyl bis(tetrahydroindenyl) zirconium dichloride was synthesized in accordance with "J. Orgmet. Chem." (342), pages 21 to 29, (1988), and "J. Orgmet. Chem." (369), pages 359 to 370, (1989).

Specifically, in a 300 ml-flask whose interior had been substituted with nitrogen, 5.4 g of bis(indenyl) dimethylsilane was diluted in 150 ml of THF, and these substances were cooled to a temperature of not more than −50° C. Thereafter, 23.6 ml of a dilute solution of 0.038 mol of n-butyl lithium in hexane (1.6 M/L) was dropped in over a period of 30 minutes. After the completion of the dropping, the temperature of the above substances was raised to room temperature over 1 hour, and, while the temperature was being raised, the substances were allowed to react for 4 hours, thereby synthesizing a reaction liquid A.

200 ml of THF was introduced into a nitrogen-substituted, 500 ml-flask, and was cooled to a temperature of not more than −50° C. Thereafter, 4.38 g of zirconium tetrachloride was gradually introduced. Then, the total amount the reaction liquid A was introduced, and the temperature of the above substances was gradually raised to room temperature over 3 hours. After their temperature had been raised to 60° C., these substances were allowed to react for 2 hours. After the completion of the reaction, the solvent was removed by reduced-pressure distillation. The remaining substances were dissolved in 100 ml of toluene, and the distillation-removal of solvent was again performed, thereby obtaining 3.86 g of crude crystals of dimethylsilyl bis(indenyl) zirconium dichloride.

Subsequently, the crude crystals were dissolved in 150 ml of dichloromethane, and the solution was introduced into a 500 ml-autoclave. After 5 g of a platinum-carbon catalyst containing 0.5 wt % of platinum was introduced, the substances were subjected to hydrogenation at 50° C. for 5 hours under a hydrogen pressure of 50 kg/cm$^2$G. After the completion of this reaction, the catalyst was separated by filtering, the solvent was removed by reduced-pressure distillation, and the remaining substances were subjected to toluene-extraction and then recrystallization, thereby obtaining 1.26 g of dimethylsilyl bis(tetrahydroindenyl) zirconium dichloride.

v) Catalyst Component (D)-2

100 ml of dehydrated and deoxidated toluene was introduced into a 1000 ml-flask equipped with a reflux condenser and an agitator, whose interior had been subjected to sufficient nitrogen-substitution. Then, two dropping funnels were prepared; in one of the funnels, 0.72 g (10 mmol) of trimethyl aluminum and 1.96 g (10 mmol) of triisobutyl aluminum were diluted in 50 ml of toluene, and in the other, saturated-water containing toluene was introduced. From these funnels, the mixed aluminum solution and the saturated-water containing toluene were fed by amounts containing equal mols of Al and water over 3 hours at 30° C. After the completion of the feeding, the above substances had their temperature raised to 50° C., and they were allowed to react for 2 hours. After the completion of the reaction, the solvent was removed by reduced-pressure distillation, thereby obtaining 1.9 g of a white solid, which was methylisobutylalumoxane.

The propylene polymers (A)-5 and (A)-6 were produced using suitable combinations of the catalyst components (C)-3 and (D)-2 mentioned above.

Preparation of Propylene Polymer (A)

i) Propylene polymer (A)-1

The interior of an agitation-type autoclave having a capacity of 15 liters was sufficiently substituted with propylene. Then, 5 liters of sufficiently dehydrated and deoxidated n-heptane was introduced into the autoclave, and also introduced therein were 100 mmol of methylalumoxane (in terms of Al atoms), i.e., the catalyst component (D)-1, and 100 mmol of isopropylidene (cyclopentadienyl) (fluorenyl) zirconium dichloride, i.e., the catalyst component (C)-1 . Thereafter, propylene was introduced, and polymerization was conducted at 20° C. for 15 minutes. Subsequently, further propylene was introduced, and, under an autoclave internal pressure of 7 kg/cm$^2$G, polymerization was conducted at 40° C. for 2 hours. After the completion of the reaction, 500 ml of butanol was added, and catalyst removal was conducted at 50° C. for 1 hour. Thereafter, the resultant substances were pressure-delivered by small amounts into a steam-stripping vessel. Then, the solvent was evaporated, and the polymer was separated and dried, thereby obtaining 430 g of propylene polymer (A)-1. The thus obtained propylene polymer (A)-1 was subjected to GPC measurement (which provided the results of the number average molecular weight=64,000, and Mw/Mn=2.21), MFR measurement which provided the result of 7.93 g/10 min.), and DSC measurement (which provided the result that there were two peaks at 141.0° C. and 135.7° C. TREF measurement provided the results that the mean elution temperature ($T_{50}$) was 81° C., and the elution dispersion degree was 3.5.

ii) Propylene polymer (A)-2

490 g of propylene polymer (A)-2 was obtained by exactly the same process as the propylene polymer (A)-1 except that the polymerization temperature was 50° C.

The propylene polymer (A)-2 was subjected to similar measurements. As a result, it was found that the number average molecular weight=51,000, Mw/Mn=2.20, MFR=13.5 (g/10 min.), and there were two melting-point peaks at 134.2° C. and 127.0° C. TREF measurement provided the results that the mean elution temperature ($T_{50}$) was 63° C. and the elution dispersion degree was 4.7.

iii) Propylene Polymer (A)-3

The interior of an agitation-type autoclave having a capacity of 15 liters was sufficiently substituted with propylene. Then, 5 liters of sufficiently dehydrated and deoxidated n-heptane was introduced into the autoclave, and also introduced therein were 100 mmol of methylalumoxane (in terms Al atoms), i.e., the catalyst component (D)-1, and 10.0 mmol of ethylene bis-(2-methylindenyl) zirconium dichloride, i.e., the catalyst component (C)-2. Thereafter, propylene was introduced, and polymerization was conducted at 20° C. for 15 minutes. Subsequently, further propylene was introduced, and, under an autoclave internal pressure of 7 kg/cm$^2$G, polymerization was conducted at 40° C. for 2 hours. After the completion of the reaction, 500 ml of butanol was added, and catalyst removal was conducted at 50° C. for 1 hour. Thereafter, the resultant substances were pressure-delivered by small amounts into a steam-stripping vessel. Then, the solvent was evaporated, and the polymer was separated and collected, thereby obtaining 860 g of propylene polymer (A)-3. The thus obtained propylene polymer (A)-3 had a number average molecular weight of 23,500, a molecular weight distribution (Mw/Mn) of 2.05, and a melting point of 135.2° C. TREF measurement of the propylene polymer (A)-3 provided the results that the mean elution temperature ($T_{50}$) was 87° C., and the elution dispersion degree was 3.6.

iv) Propylene Polymer (A)-4 for Comparison

A propylene polymer containing no ethylene and having an MFR of 7.6 ["MH-4" (trade name) produced by Mitsubishi Petrochemical Co.,] was used as propylene polymer (A)-4 for comparison. This propylene polymer (A)-4 had an average molecular distribution (Mw/Mn) of 6.2, a melting point of 169.6° C., a mean elution temperature ($T_{50}$) of 120° C., and an elution dispersion degree of 5.1.

v) Propylene polymer (A)-5

In a stainless steel autoclave having a capacity of 15 liters and equipped with an agitator and a temperature controller, 5 liters of sufficiently dehydrated and deoxidated n-heptane, 4.6 mg of dimethylsilyl bis(tetrahydroindenyl) zirconium dichloride, i.e., the catalyst component (C)-3, and 30 mmol of methylisobutylalumoxane (in terms of aluminum atoms), i.e., the catalyst component (D)-2, were introduced. Under a polymerization condition of 40° C., propylene and ethylene were fed at rates of 360 g/hour and 7.4 g/hour, respectively, for 4 hours. When the feeding had been completed, the pressure within the system was 3.5 kg/cm$^2$G. Polymerization was continuously conducted for 3 hours after the completion of the feeding, with the result that the inner system pressure lowered to 1.7 kg/cm$^2$G. Then, the remaining gas was purged, 400 ml of butanol was added, and catalyst removal was conducted at 50° C. for 1 hour. Thereafter, the resultant substances were pressure-delivered by small amounts into a steam-stripping vessel. Then, the solvent was evaporated, and the polymer was separated and dried, thereby obtaining 1.10 kg of copolymer (A)-5, which contained 2.5 wt % of ethylene. The thus obtained copolymer (A)-5 was subjected to GPC measurement which provided the results of the number average molecular weight=23,000, and Mw/Mn=2.00. DSC measurement of the copolymer (A)-5 provided the result that the melting point was 128.6° C. TREF measurement provided the results that the mean elution temperature ($T_{50}$) was 74° C., and the elution dispersion degree was 3.5.

The mean elution temperature ($T_{50}$) of a polymer sample was evaluated by a TREF method in the following manner:

A sample of the polymer was dissolved in o-dichlorobenzene to prepare a 0.4 wt %-solution thereof. A certain amount of the solution corresponding to 2 mg of the sample was poured into a cross fractionation chromatograph ["CFC-101-L" (trade name) produced by Mitsubishi Petrochemical Co.,], and was cooled from 140° C. to 0° C. at a cooling speed of 1° C./min. Thereafter, the sample was held in a TREF column. Then, the temperature was raised stepwise from 0° C. to 10°, 20°, 30°, 40°, 45°, 52°, 55°, 58°, 61°, 64°, 67°, 70°, 73°, 76°, 79°, 82°, 85°, 88°, 91°, 94°, 97°, 100°, 102°, 105°, 120°, and 140° C., and polymer portions eluted at each temperature were drawn from the column at a speed of 1.0 cm³/min. The elutes were automatically sent to a GPC column, and separated. The concentration of the eluted polymer was determined with an infrared detector at a wavelength of 3.42 μm. Data on peaks was processed in accordance with the program attached to the apparatus. The elution temperature at which the accumulated weight of the eluted polymer portion equaled 50% of the total weight was evaluated as the mean elution temperature ($T_{50}$) of the polymer sample.

vi) Propylene polymer (A)-6

1,150 g of copolymer (A)-6 was obtained by exactly the same process as the copolymer (A)-5 except that the ethylene-feeding rate was changed to 15.0 g/hour. The copolymer contained 5.7 wt % of ethylene, and had a number average molecular weight of 22,600, a molecular weight distribution (Mw/Mn) of 2.15, and a melting point of 114° C. The copolymer (A)-6 also had a mean elution temperature ($T_{50}$) of 58° C., and an elution dispersion degree of 8.8, these results being obtained by TREF measurement.

2. Production of Propylene Random Copolymers (B)

A propylene-ethylene random copolymer containing 2.5 wt % of ethylene ["FB3" (trade name) produced by Mitsubishi Petrochemical Co.,] was used as propylene random copolymer (B)-1. This copolymer (B)-1 had an MFR of 9.2, a molecular weight distribution (Mw/Mn) of 6.5, a melting point of 147.7° C., a mean elution temperature ($T_{50}$) of 95° C., and an elution dispersion degree of 7.2.

A propylene-ethylene random copolymer containing 4.5 wt % of ethylene ["FX4" (trade name) produced by Mitsubishi Petrochemical Co.,] was used as propylene random copolymer (B)-2. This copolymer (B)-2 had an MFR of 6.2, a molecular weight distribution (Mw/Mn) of 5.9, a melting point of 140° C., a mean elution temperature ($T_{50}$) of 87° C., and an elution dispersion degree of 10.5.

EXAMPLE 1

A base-layer was produced by mixing 100 parts of polypropylene having an MFR of 2.3 g/10 min. and II of 98% ["FL6S" (trade name) produced by Mitsubishi Petrochemical Co.,], 0.6 parts by weight of glycerin monostearate and 0.1 parts by weight of N, N' bis(2-hydroxyethyl) alkylamine.

A surface-layer composition was produced by first mixing 10 parts by weight of propylene polymer (A)-1, 90 parts by weight of copolymer (B)-1, 0.10 parts by weight of 2, 6-di-t-butyl-p-cresol as an antioxidant, 0.05 parts by weight of calcium stearate as a hydrochloric acid-catching agent, and 0.15 parts by weight of silica having an average particle size of 3 μm. After the mixing, these substances were formed into pellets.

The thus prepared layer compositions were, as described below, formed into superimposed layers, and then subjected to a plurality of biaxial orientation processes, thereby obtaining a biaxially-oriented layered film.

The above-described propylene to form a base layer and the composition according to the present invention which was to form surface layers were subjected to fused co-extrusion at 250° C. from extruders having diameters of 115 mm and 35 mm into a three-layer die so that a three-layer construction of surface-layer composition/polypropylene/surface-layer composition would be formed, thereby forming a sheet. The sheet was five-times oriented at 115° C. in a radial direction by utilizing differences in circumferential speed between rolls. Then, the sheet was ten-times oriented in a lateral direction in a tenter oven at 168° C. Thereafter, the resultant oriented film was thermally set at 155° C. Subsequently, one surface of the film was subjected to corona discharge treatment, thereby obtaining a biaxially-oriented layered film. This film had layers having thickness of 1 mμ/23 mμ/1 mμ.

The heat sealing temperature and the blocking resistance of the film were evaluated in the following manner. The results of this evaluation are shown in Table 1.

Heat Sealing Temperature

Pieces of the above film were subjected to sealing with a heat sealing bar having dimensions of 5 mm×200 mm, at various prescribed temperatures, and under heat sealing conditions comprising a heat sealing pressure of 1 kg/cm² and a heat sealing period of 0.5 sec. Film samples, each having a width of 20 mm, were cut out from each of the film pieces, and separated from each other with a Schopper tensile tester at a tensile speed of 500 mm/min. A temperature corresponding to 100 gram-strength was evaluated as the heat sealing temperature of each film.

Blocking Resistance

Two pieces of each of the films were superimposed on each other over a contact area of 10 cm² while their surfaces subjected to corona discharge treatment contacted each other. The superpimposed film pieces were disposed between two sheets of glass, and kept in a state of being subjected to a load of 50 g/cm² in a 40° C. atmosphere for 24 hours. Thereafter, a maximum load for separating the film pieces with a Schopper tensile tester was evaluated as the blocking resistance of each film.

EXAMPLES 2 and 3 and COMPARATIVE EXAMPLE 1

Films were obtained and evaluated in exactly the same manner as in Example 1 except that the blending ratios of the propylene polymer (A)-1 and the propylene-ethylene random copolymer (B)-1 were changed to the ratios shown in Table 1.

EXAMPLES 4 and 5 and COMPARATIVE EXAMPLE 2

Films were obtained and evaluated in exactly the same manner as in Example 1 except that, in these 3 Examples, the propylene polymer (A)-1 used in Example 1 was substituted by the propylene polymers (A)-2, (A)-3 and (A)-4, respectively.

COMPARATIVE EXAMPLE 3

A film was obtained and evaluated in exactly the same manner as in Example 1 except that surface layers were formed by using 100 parts by weight of propylene-ethylene random copolymer (B)-1 alone.

The results of the above-described examples are shown in Table 1. The film of Comparative Example 1 had too severe a surface roughness to be usable, and thus, it was impossible to evaluate its heat sealing temperature and blocking resistance.

EXAMPLE 6

A base-layer was produced by mixing 100 parts of polypropylene ["FL6S" (trade name) described before] having an MFR of 2.3 g/10 min. and II of 98%, 0.6 parts by weight of glycerin monostearate and 0.1 parts by weight of N, N' bis(2-hydroxyethyl) alkylamine.

A surface-layer composition was produced by first mixing 10 parts by weight of copolymer (A)-5, 90 parts by weight of copolymer (B)-1 and 0.10 parts by weight of 2, 6-di-t-butyl-p-cresol as an antioxidant, 0.05 parts by weight of calcium stearate as a hydrochloric acid-catching agent, and 0.15 parts by weight of silica having an average particle size of 3 μm. After the mixing, these substances were formed into pellets.

The thus prepared layer compositions were, as described below, formed into superimposed layers, and then subjected to a plurality of biaxial orientation processes, thereby obtaining a biaxially-oriented layered film.

The above-described propylene to form a base layer and the composition according to the present invention which was to form surface layers were subjected to fused co-extrusion at 250° C. from extruders having diameters of 115 mm and 35 mm into a three-layer die so that a three-layer construction of surface-layer composition/polypropylene/surface-layer composition would be formed, thereby forming a sheet. The sheet was five times oriented at 115° C. in a radial direction by utilizing a difference in circumferential speed between rolls. Then, the sheet was ten-times oriented in a lateral direction in a tenter oven at 168° C. Thereafter, the resultant oriented film was thermally set at 155° C. Subsequently, one surface of the film was subjected to corona discharge treatment, thereby obtaining a biaxially-oriented layered film. This film had layers having thickness of 1 μm/23 μm/1 μm.

The heat sealing temperature and the blocking resistance of the film were evaluated in the following manner. The results of this evaluation are shown in Table 2.

EXAMPLES 7 AND 8

Films were obtained and evaluated in exactly the same manner as in Example 6 except that the blending ratios of the copolymer (A)-5 and the copolymer (B)-1 were changed to the ratios shown in Table 2.

EXAMPLE 9

A film was obtained and evaluated in exactly the same manner as in Example 6 except that, in Example 9, the copolymer (A)-5 used in Example 6 was substituted by the copolymer (A)-6.

COMPARATIVE EXAMPLE 4

A film was obtained and evaluated in exactly the same manner as in Example 6 except that surface layers were formed by using 100 parts by weight of propylene-ethylene random copolymer (B)-2 alone.

The results of the above-described examples are shown in Table 2.

TABLE 1

| | | PROPYLENE POLYMER | | PROPYLENE RANDOM COPOLYMER | | HEAT SEALING TEMPERATURE (°C.) | BLOCKING RESISTANCE (g/10 cm²) | REFERENCE |
|---|---|---|---|---|---|---|---|---|
| | | TYPE | AMOUNT | | | | | |
| EXAMPLE | 1 | (A)-1 | 10 parts by weight | (B)-1 | 90 parts by weight | 122 | 50 | |
| | 2 | " | 20 parts by weight | " | 80 parts by weight | 119 | 20 | |
| | 3 | " | 50 parts by weight | " | 50 parts by weight | 116 | 0 | |
| | 4 | (A)-2 | 10 parts by weight | " | 90 parts by weight | 118 | 40 | |
| | 5 | (A)-3 | 10 parts by weight | " | 90 parts by weight | 120 | 40 | |
| COMPARATIVE EXAMPLE | 1 | (A)-1 | 80 parts by weight | " | 20 parts by weight | EVALUATION IMPOSSIBLE | EVALUATION IMPOSSIBLE | (NOTE) 1 |
| | 2 | (A)-4 | 10 parts by weight | " | 90 parts by weight | 132 | 120 | |
| | 3 | — | | " | 100 parts by weight | 130 | 120 | |

(NOTE)
1: Severe surface roughness

TABLE 2

| | | PROPYLENE RANDOM POLYMER | | PROPYLENE COPOLYMER | | HEAT SEALING TEMPERATURE (°C.) | BLOCKING RESISTANCE (g/10 cm²) |
|---|---|---|---|---|---|---|---|
| | | TYPE | AMOUNT | TYPE | AMOUNT | | |
| EXAMPLE | 6 | (A)-5 | 10 parts by weight | (B)-1 | 90 parts by weight | 120 | 20 |
| | 7 | " | 20 parts by | " | 80 parts by | 118 | 40 |

TABLE 2-continued

| | PROPYLENE RANDOM POLYMER | | PROPYLENE COPOLYMER | | HEAT SEALING TEMPERATURE (°C.) | BLOCKING RESISTANCE (g/10 cm²) |
|---|---|---|---|---|---|---|
| | TYPE | AMOUNT | TYPE | AMOUNT | | |
| 8 | " | 50 parts by weight | " | 50 parts by weight | 113 | 30 |
| 9 | (A)-6 | 10 parts by weight | " | 90 parts by weight | 115 | 40 |
| COMPARATIVE EXAMPLE 4 | (A)-5 | 80 parts by weight | " | 20 parts by weight | EVALUATION IMPOSSIBLE | EVALUATION IMPOSSIBLE |
| 5 | — | | (B)-2 | 100 parts by weight | 120 | 300 |

What is claimed is:

1. A polypropylene composition containing 3 to 50% by weight of the following propylene polymer (A), and 97 to 50% by weight of the following propylene random copolymer (B):

propylene polymer (A):
a propylene polymer having the following properties (a) to (c):
(a) the propylene polymer is either a propylene homopolymer or a propylene polymer containing not more than 10 mol % of ethylene or an α-olefin having a carbon number of 4 to 20 and having a number average molecular weight (Mn) of 10,000 to 300,000;
(b) the propylene polymer has a molecular weight distribution (Mw/Mn) within the range of 1 to 2.8; and
(c) the propylene polymer has a mean elution temperature ($T_{50}$) ranging from 50° to 90° C., and an elution dispersion degree (σ value) of 0.1 to not more than 9, propylene random copolymer (B):
a propylene random copolymer comprising propylene, and ethylene and/or an α-olefin having a carbon number of 4 to 20, the propylene random copolymer having the following properties (d) and (e):
(d) the propylene random copolymer has 90 to 99.5 mol % of structural units obtained from propylene, and 0.5 to 10 mol % of structural units obtained from ethylene and/or an α-olefin having a carbon number of 4 to 20; and has a number average molecular weight (Mn) of 10,000 to 200,000;
(e) the propylene random copolymer has a molecular weight distribution (Mw/Mn) of 4 to 9.

2. A polypropylene composition containing 3 to 50% by weight of the following propylene polymer (A), and 97 to 50% by weight of the following propylene random copolymer (B):

propylene polymer (A):
a propylene polymer having the following properties (a) to (c):
(a) the propylene polymer is either a propylene homopolymer or a propylene polymer containing less than 0.5 mol % of ethylene or an α-olefin having a carbon number of 4 to 20 and having a number average molecular weight (Mn) of 10,000 to 300,000;
(b) the propylene polymer has a molecular weight distribution (Mw/Mn) within the range of 1 to 2.8; and
(c) the propylene polymer has a mean elution temperature ($T_{50}$) ranging from 40° to 100° C., and an elution dispersion degree (σ value) of 0.1 to not more than 9, propylene random copolymer (B):
a propylene random copolymer comprising propylene, and ethylene and/or an α-olefin having a carbon number of 4 to 20, the propylene random copolymer having the following properties (d) and (e):
(d) the propylene random copolymer has 90 to 99.5 mol % of structural units obtained from propylene, and 0.5 to 10 mol % of structural units obtained from ethylene and/or an α-olefin having a carbon number of 4 to 20; and
has a number average molecular weight (Mn) of 10,000 to 200,000;
(e) the propylene random copolymer has a molecular weight distribution (Mw/Mn) of 4 to 9.

3. A copolymer composition containing 1 to 70% by weight of the following propylene copolymer (A), and 99 to 30% by weight of the following propylene random copolymer (B):

propylene random copolymer (A):
a propylene random copolymer (A) comprising propylene, and ethylene and/or an α-olefin having a carbon number of 4 to 20, the propylene random copolymer (A) having the following properties (a) to (c):
(a) the propylene random copolymer has 90 to 99.5 mol % of structural units obtained from propylene, and 0.5 to 10 mol % of structural units obtained from ethylene and/or an α-olefin having a carbon number of 4 to 20 and having a number average molecular weight (Mn) of 10,000 to 300,000;
(b) the propylene random copolymer (A) has a molecular weight distribution (Mw/Mn) of within the range of 1 to 2.8; and
(c) the propylene random copolymer (A) has a mean elution temperature ($T_{50}$) ranging from 50° to 90° C., and an elution dispersion degree (σ value) of not more than 10, propylene random copolymer (B):
a propylene random copolymer (B) comprising propylene, and ethylene and/or an α-olefin having a carbon number of 4 to 20, the propylene random copolymer (B) having the following properties (d) and (e):
(d) the propylene random copolymer has 90 to 99.5 mol % of structural units obtained from propylene, and 0.5 to 10 mol % of structural units obtained from ethylene and/or an α-olefin having a carbon number of 4 to 20; and has a number average molecular weight (Mn) of 10,000 to 200,000; and
(e) the propylene random copolymer (B) has a molecular weight distribution (Mw/Mn) of 4 to 9.

4. A polypropylene composition containing 3 to 50% by weight of the following propylene copolymer (A), and 97 to 50% by weight of the following propylene random copolymer (B):

propylene polymer (A):

a propylene polymer having the following properties (a) to (c):

(a) the propylene polymer is either a propylene homopolymer or a propylene polymer containing not more than 10 mol % of ethylene having a number average molecular weight (Mn) of 10,000 to 300,000;

(b) the propylene polymer has a molecular weight distribution (Mw/Mn) within the range of 1 to 2.8; and (c) the propylene polymer has a mean elution temperature ($T_{50}$) ranging from 50° to 90° C., and an elution dispersion degree ($\sigma$ value) of 0.1 to not more than 9, propylene random copolymer (B):

a propylene random copolymer comprising of propylene and ethylene and having the following properties (d) and (e):

(d) the propylene random copolymer has 90 to 99.5 mol % of structural units obtained from propylene, and 0.5 to 10 mol % of structural units obtained from ethylene and has a number average molecular weight (Mn) of 10,000 to 200,000; and (e) the propylene random copolymer has a molecular weight distribution (Mw/Mn) of 4 to 9.

5. A polypropylene composition containing 3 to 50% by weight of the following propylene polymer (A), and 97 to 50% by weight of the following propylene random copolymer (B):

propylene polymer (A):

a propylene polymer having the following properties (a) to (c):

(a) the propylene polymer is either a propylene homopolymer or a propylene polymer containing not more than 0.5 mol % of ethylene and having a number average molecular weight (Mn) of 10,000 to 300,000;

(b) the propylene polymer has a molecular weight distribution (Mw/Mn) within the range of 1 to 2.8; and (c) the propylene polymer has a mean elution temperature ($T_{50}$) ranging from 50° to 90° C., and an elution dispersion degree ($\sigma$ value) of 0.1 to not more than 9, propylene random copolymer (B):

a propylene random copolymer consisting of propylene and ethylene and having the following properties (d) and (e):

(d) the propylene random copolymer has 90 to 99.5 mol % of structural units obtained from propylene, and 0.5 to 10 mol % of structural units obtained from ethylene and has a number average molecular weight (Mn) of 10,000 to 200,000; and (e) the propylene random copolymer has a molecular weight distribution (Mw/Mn) of 4 to 9.

6. A copolymer composition containing 3 to 50% by weight of the following propylene polymer (A), and 97 to 50% by weight of the following propylene random copolymer (B):

propylene random copolymer (A):

a propylene random copolymer (A) consisting of propylene and ethylene and having the following properties (a) to (c):

(a) the propylene random copolymer has 90 to 99.5 mol % of structural units obtained from propylene, and 0.5 to 10 mol % of structural units obtained from ethylene and has a number average molecular weight (Mn) of 10,000 to 300,000;

(b) the propylene random copolymer (A) has a molecular weight distribution (Mw/Mn) of within a range of 1 to 2.8; and (c) the propylene random copolymer (A) has a mean elution temperature ($T_{50}$) ranging from 50° to 90° C., and an elution dispersion degree ($\sigma$ value) of 0.1 or more and not more than 9, propylene random copolymer (B):

a propylene random copolymer (B) consisting of propylene and ethylene and having the following properties (d) and (e):

(d) the propylene random copolymer (B) has 90 to 99.5 mol % of structural units obtained from propylene, and 0.5 to 10 mol % of structural units obtained from ethylene and has a number average molecular weight (Mn) of 10,000 to 200,000; and (e) the propylene random copolymer (B) has a molecular weight distribution (Mw/Mn) of 4 to 9.

* * * * *